US005631078A

United States Patent [19]

Ellery et al.

[11] Patent Number: 5,631,078

[45] Date of Patent: May 20, 1997

[54] FILMS MADE FROM PAPER CONTAINING CELLULOSE ESTER FIBER

[75] Inventors: Eric E. Ellery; Melvin G. Mitchell, both of Kingsport; Charles K. Crosswhite, Blountville, all of Tenn.; Donald W. Monk, Brevard, N.C.

[73] Assignee: Eastman Chemical Company, Kingsport, Tenn.

[21] Appl. No.: 550,474

[22] Filed: Oct. 30, 1995

[51] Int. Cl.$^6$ .......... B32B 3/26

[52] U.S. Cl. .......... 428/311.71; 428/195; 428/532; 428/533; 428/534; 428/535; 428/536; 428/537.1; 428/537.5; 428/332; 428/311.11; 428/315.5

[58] Field of Search .......... 428/49 B, 195, 428/532–537.5, 485, 537.7, 481, 393, 332, 335, 311.1, 311.7, 315.5, 248, 274; 264/50, 123; 222/464.1; 106/169

[56] References Cited

U.S. PATENT DOCUMENTS

| | | | |
|---|---|---|---|
| 1,631,750 | 6/1927 | McIntosh . | |
| 2,976,205 | 3/1961 | Snead | 162/157 |
| 2,992,156 | 7/1961 | Schulwitz | 162/157 |
| 3,261,899 | 7/1966 | Coates | 264/123 |
| 3,627,567 | 12/1971 | Tensho | 117/76 T |
| 5,219,646 | 6/1993 | Gallagher et al. | 428/287 |
| 5,250,353 | 10/1993 | Bartholomew et al. | 428/328 |
| 5,478,386 | 12/1995 | Itoh et al. | 106/169 |

*Primary Examiner*—Kathleen Choi
*Attorney, Agent, or Firm*—Cheryl J. Tubach; Harry J. Gwinnell

[57] ABSTRACT

A thermoplastic film is comprised of an admixture of 20 to 85 weight percent cellulose ester fibers and 80 to 15 weight percent cellulose fibers and a functional amount of a cellulose ester plasticizer. The film has an opacity in the range of 10 to 85 percent, a thickness in the range of 0.002 to 0.010 inch, a porosity in the range of 0.0 to 50 ml/min/cm$^2$ at a 1.0 centibar pressure drop and a compostability of less than 65 days fragmentation. The film is prepared by making a paper comprised of 20 to 85 weight percent cellulose ester fibers and 80 to 15 weight percent cellulose fibers and saturating the paper with a functional amount of a cellulose ester plasticizer. The saturated paper is subjected to heat and pressure for a period of time to obtain the thermoplastic film. The thermoplastic film is prepared without the use of solvents and is economically attractive since it is compatible with conventional paper printing materials and techniques.

14 Claims, No Drawings

FILMS MADE FROM PAPER CONTAINING CELLULOSE ESTER FIBER

TECHNICAL FIELD

This invention relates generally to thermoplastic films. More particularly, this invention relates to thermoplastic films made from cellulose ester fibers and processes for preparing such films.

BACKGROUND OF THE INVENTION

Films made from cellulose ester fibers are useful for making molded products and as transparent sheeting. The films are typically composed of 100 percent cellulose acetate fibers and prepared by melting the cellulose acetate and casting or extruding it into a sheet form. This generally involves the use of solvents to prepare a dispersion of the cellulose acetate fibers so that an extremely thin sheet may be formed.

Thermoplastic films being made from 100 percent cellulose acetate fibers are typically used for applications requiring substantially transparent or lightly tinted materials. Once in film form whether by extrusion or other methods, the cellulose acetate film may be printed upon with the print resting on the surface of the film only. Typically a fast drying, specially formulated ink is required to prevent ink run-off or smearing. Additionally, these 100 percent cellulose acetate films are fairly expensive due to the extensive manufacturing processes required to produce cellulose acetate materials.

Another method of preparing cellulose acetate film which does not involve solvents and eliminates the extrusion/molding process is disclosed in U.S. Pat. No. 2,976,205 to Snead. These films are prepared from cellulose acetate webs that have been coated with a plasticizer and then subjected to heat and pressure. The cellulose acetate webs are formed on a wire of a papermaking machine from an aqueous dispersion of fibrous flocculated cellulose acetate. However, the cellulose acetate webs are extremely weak due to the extensive refining required to create uniformity in the dispersion. The webs are not capable of undergoing stressful processes such as printing prior to conversion into the film form. Once in the film form the printing problems as disclosed above still exist.

Thus, there exists a need in the art for a thermoplastic film that eliminates the use of solvents, is a simplified process, may be printed upon using conventional paper printing materials and techniques and is economically attractive to the end user.

SUMMARY OF THE INVENTION

A thermoplastic film is comprised of an admixture of 20 to 85 weight percent cellulose ester fibers and 80 to 15 weight percent cellulose fibers and a functional amount of a cellulose ester plasticizer. The film has an opacity in the range of 10 to 85 percent, a thickness in the range of 0.002 to 0.010 inch, and a porosity in the range of 0.0 to 50 ml/min/cm$^2$ at a 1.0 centibar pressure drop and a compostability of less than 65 days fragmentation.

In another aspect of the invention the film, as described above, is prepared by making a paper comprised of 20 to 85 weight percent cellulose ester fibers and 80 to 15 weight percent cellulose fibers and saturating the paper with a functional amount of a cellulose ester plasticizer. The saturated paper is subjected to heat and pressure for a period of time to obtain a thermoplastic film.

DETAILED DESCRIPTION OF THE INVENTION

A thermoplastic film is made from paper containing cellulose ester fibers and cellulose pulp. The paper is made using standard papermaking techniques and chemistry. The paper is converted into a thermoplastic film by application of heat and pressure. The resulting thermoplastic film comprises an admixture of 20 to 85 weight percent cellulose ester fibers and 80 to 15 weight percent cellulose fiber and a functional amount of a cellulose ester plasticizer. The film has an opacity in the range of 10 to 85 percent, a thickness in the range of 0.002 to 0.010 inch, a porosity in the range of 0.0 to 50 ml/min/cm$^2$ at a 1.0 centibar pressure drop and a compostability of less than 65 days fragmentation.

Preferably, the admixture comprises 50 to 85 weight percent cellulose ester fibers and 50 to 15 weight percent cellulose fibers. The cellulose ester fibers are preferably cellulose acetate, cellulose acetate butyrate and cellulose acetate propionate. The more preferred cellulose ester is cellulose acetate.

The cellulose acetate fibers utilized in this invention are preferably diester fibers with an acetyl content of 34 to 41 weight percent. The fibers may have a round or trilobal cross section. The fibers may or may not be surface hydrolyzed. The cellulose fibers utilized in the invention are typically standard hardwood or softwood pulp fibers.

Since the thermoplastic film is made from the application of heat and pressure to an intermediary paper product, as described in more detail below, the composition of the cellulose ester fibers of the paper and the film are essentially the same. Thus, the preferred cellulose acetate fibers are those surface hydrolyzed cellulose acetate fibers that are in the paper composition as disclosed in U.S. application Ser. No. 08/506,986 filed Jul. 28, 1995. These cellulose acetate fibers have a sheath of regenerated cellulose being from about 4 to about 15 weight percent of the weight of the cellulose acetate fibers and a core of cellulose acetate. The cellulose acetate fibers contain no substantial crimp, have an average length from about 1 to 7 mm, a density from about 1.20 to 1.35 gm/cc, a denier from about 1 to 30 gm/9,000 meters and a uniform dispersion index of less than 0.15. These surface hydrolyzed cellulose acetate fibers are preferably made in accordance with U.S. application Ser. No. 08/375,140 filed Jan. 19, 1995 or U.S. application Ser. No. 08/375,765 filed Jan. 19, 1995.

In another preferred embodiment of the invention the cellulose acetate fibers of the film are not surface treated and are like those in the paper composition disclosed in U.S. application Ser. No. 08/375,766 filed Jan. 19, 1995. These cellulose acetate fibers are uniformly dispersed, have a weighted average length in the range of 1 to 7 mm, have a density in the range of 1.20 to 1.35 gm/cm, have a denier in the range of 1 to 30, have a range of 0.1 to 0.2 weight percent lubricant thereon, exhibit no substantial fibrillation and have a uniform dispersion index of 0.15. The preferred method of preparing these cellulose acetate fibers with no surface treatment is disclosed in U.S. application Ser. No. 08/245,117 filed May 17, 1994.

The plasticizer employed in accordance with this invention may be any plasticizer composition that is compatible with cellulose esters and that causes the cellulose ester and cellulose containing paper to convert to a plastic-like film with the application of heat and pressure. For cellulose acetate, compatible plasticizers include high boiling esters of polyhydric alcohols such as diacetin, triethylene glycol diacetate and triacetin; high boiling esters of carboxylic acid such as alkyl or aryl esters of citric acid, adipic acid, maleic acid and phthalic acid which include dimethyl phthalate and triethyl citrate; organic esters of inorganic acids such as tributyl phosphate, triethyl and tripropyl phosphate, and trichloroethyl phosphate; alkoxy alkyl esters of inorganic acids or of organic polybasic acids such as di(methoxy ethyl) phthalate, di(methoxy ethyl) adipate, di(methoxy ethoxy ethyl) adipate and methyl phthalyl ethyl glycolate, ortho- and para-N-ethyl toluene sulfonamides; and high boiling ethers such as butyl ether of ethylene glycol, methyl ether of ethylene glycol, etc. Preferably the plasticizers are diethyl phthalate, triethyl citrate, BENZOFLEX 400™ plasticizer, KETJENFLEX 8™ plasticizer, KETJENFLEX 9S™ plasticizer, EASTMAN 240™ plasticizer, triacetin, triacetin/1–3 weight percent cellulose acetate solution and triacetin/diethyl phthalate.

The trademarked products are specially formulated chemicals used as plasticizer. BENZOFLEX 400™ plasticizer available from Velsicol Chemical Corporation of Rosemont, Ill. is polypropylene glycol-dibenzoate-benzoate ester or poly oxy(methyl-1,2-ethanediyl)-benzoyl-(benzoyloxy). The KETJENFLEX products are available from Akzo Nobel Chemicals, Inc. of Dobbs Ferry, N.Y. KETJENFLEX 8™ plasticizer is 60 weight percent N-ethyl-2-methyl-benzenesulfonamide and 40 weight percent N-ethyl-4-methyl-benzenesulfonamide. KETJENFLEX 9S™ is 60 percent 4-methyl-benzenesulfonamide and 40 percent 2-methyl-benzenesulfonamide. EASTMAN 240™ plasticizer available from Eastman Chemical Co. of Kingsport, Tenn. is 72 weight percent diethyl phthalate, 22 weight percent dimethyl phthalate and 6 weight percent 2,2,4-trimethyl-1,3-pentanediol-diisobutyrate.

The triacetin/1–3 weight percent cellulose acetate solution is an amount of triacetin compounded with small amounts of cellulose acetate flake in the range of 1 to 3 weight percent. This allows for milder conditions of temperature and pressure in the conversion of paper to film, as discussed below.

The functional amount of plasticizer is that which is enough to convert the paper to a film and is preferably in the range of 20 to 150 weight percent based on the weight of the cellulose ester fiber. More preferably, the amount of plasticizer is in the range of 45 to 120 weight percent. This amount of plasticizer employed is generally an amount which saturates the paper. As used herein, the term "saturate" refers to the commonly used definition applied in the papermaking industry. Thus, "saturate" and its derivations means wetting the paper such that the plasticizer has penetrated the thickness of the paper, but has not necessarily wetted the paper to the point at which it can contain no more plasticizer.

The thickness of the thermoplastic film of the present invention ranges from 0.002 to 0.010 inch. "Film" as used throughout this specification defines an extremely continuous sheet of a substance having no precise upper limit of thickness, but a reasonable assumption is 0.010 inch. The film is preferably without holes or cracks such that it forms an efficient barrier to molecules of atmospheric water vapor, oxygen, etc. The film is capable of having a textured surface on either one or both sides of the film.

The opacity of the thermoplastic film can vary depending on the formulation. The film preferably has an opacity in the range of 10 to 85 percent measured by ACS spectrophotometer using TAPPI Method T-425.

The porosity of the thermoplastic film ranges from 0.0 to 50 ml/min/cm$^2$ at a 1.0 centibar pressure drop. The porosity is preferably measured on a Coresta type porosimeter using a 2 or 10 cm$^2$ sample area. The level of porosity is affected by the percent cellulose ester fibers in the film, the method of preparation of the film, the basis weight of the film, the plasticizer type and amount, and several other related factors.

The compostability of the thermoplastic film is less than 65 days fragmentation. The film has been measured compostable to the point where fragments of sample films are unrecognizable from the body of the compost mixture after 65 days. More detail as to how compostability is measured is set forth in Example 5.

The thermoplastic film may be either a breathable film or a substantially moisture impermeable film as determined by the water vapor transmission rate of the film. The water vapor transmission rate measures the amount of water vapor that will pass through the film. ASTM 372A Test Method is the preferred test used. The breathable film has a water vapor transmission rate of greater than 400 gm/100 in$^2$/day. The substantially moisture impermeable film has a water vapor transmission rate of between about 15 to about 85 gm/100 in$^2$/day. By controlling the processing conditions in making the film, i.e. press conditions and plasticizer type, the film may be made either breathable or substantially moisture impermeable. For comparison, other materials have water vapor transmission rates as follows:

(a) 0.9 mil thick cellulose acetate sheet—1200 gm/100 in$^2$/day, (b) 0.9 mil thick cellophane sheet—5–7 gm/100 in$^2$/day, and (c) oriented polypropylene—7–8 gm/100 in$^2$/day.

The thermoplastic film has a unique property of encapsulating any print that is applied to the intermediary paper form of the film prior to the application of heat and pressure. This property is referred to as print inclusion. The paper product may be printed in any conventional manner such as using offset printing ink, writing upon the paper with a ballpoint pen, running the paper through a laser printer or ink jet printer, or making a photocopy from a copying machine. It is believed that upon the application of heat and pressure to the paper that the print medium is encapsulated by the liquified cellulose ester that comes to the surface of the paper during conversion. Converting the paper to the film using a platen press, a calender stack or a laminator causes print inclusion. This property may benefit a user in his ability to make abrasion and water resistant plastic or laminated surface quality on printed material. Labels, mats, warning placards, etc. could be made with this relatively simple conversion. The combination of compostability and print inclusion provides for a biodegradable plastic-like printed material.

The thermoplastic film of the present invention can be heat or radio frequency (RF) sealed to each other or to other polymers, such as polyesters and polyolefins. Since the film has the sealing characteristics of a plastic, additional binders are generally not needed thus providing a cost savings. For heat sealing, industrial package sealing equipment, such as a TMI Supersealer available from Testing Machines, Inc of Amityville, N.Y. may be used. Temperatures and pressures vary depending on the amount of cellulose ester and plasticizer in the film composition. For radio frequency sealing, a KABAR FS10000 RF Sealer available from Kabar Manufacturing Co. of Farmingdale, N.Y. may be used at a frequency of 27.12 Mhz with sealing conditions as follows: 120° C. preheat, 75% power level, 1.5 sec preseal, 1.5 sec RF seal, 0.5 sec cooling.

In a process for preparing the thermoplastic film of the present invention a paper is made comprised of 20 to 85 weight percent cellulose ester fibers and 80 to 15 weight percent cellulose fibers. The cellulose ester is preferably cellulose acetate, cellulose butyrate and cellulose propionate. The various preferred types of cellulose acetate fibers utilized in the paper are disclosed in more detail above.

The paper is saturated with a functional amount of a cellulose ester plasticizer. The saturated paper is then subjected to heat and pressure for a particular period of time. After removing the saturated paper from the heat and pressure a thermoplastic film is obtained.

The application of heat and pressure to the saturated paper is preferably conducted in a platen press at a pressure range of 200 to 500 psig and a temperature increase up to 170° C. The procedure for producing thermoplastic films using a platen press is as follows:

(1) saturate an oven dry cellulose ester and cellulose fiber containing paper substrate with a functional amount of plasticizer, (2) place saturated paper in between silicone release paper sheets and place in a cold platen press, (3) increase the press pressure to 200–500 psig, (4) increase temperature to 170° C. ±10° C., (5) hold for 1 to 10 minutes at set temperature and pressure, (6) turn on cooling water and reduce temperature to below 80° C., and (7) remove films from press and from release papers.

The paper used in the platen press may be air dried or oven dried. If oven dried it is preferred that the paper dry at 105° C. for at least 20 minutes and cool to room temperature in a desiccator. The amount of plasticizer is preferably at a retention level of 50 to 100 weight percent based on the cellulose ester content of the paper. The plasticizer may be applied by dipping the paper until saturated in a tray filled with plasticizer or a plasticizer and solvent mixture. The plasticizer/solvent mixture may be triacetin in 2-propanol. The paper should then be lifted from the solution of plasticizer and allowed to drain for removal of excess plasticizer. The treated paper may also be placed between two sheets of blotter paper and pressed in a platen press at up to 150 psig at room temperature to remove the remainder of excess plasticizer solution. The treated paper may be immediately converted in a platen press to the thermoplastic film, or it may be air dried for several hours prior to conversion.

In the pressing procedure the plasticized paper sample is sandwiched between sheets of release paper. Typically up to six sheets of paper separated by release sheets may be used in a platen press. The release paper and paper package is placed in the press at room temperature between stainless steel polished press plates. The paper samples and press plates need to be fitted to provide an even pressure. A cold to hot to cold press cycle is preferred. Constant pressure during heating and cooling phases of the press cycle is also preferred.

In another procedure for producing the thermoplastic films a calendering stack is preferably used. This process involves the following steps:

(1) saturate oven dry or air dry cellulose ester and cellulose containing paper with a functional amount of plasticizer, (2) set the desired calender loading (nip pressure) and temperature, and (3) pass the saturated paper through the press nip (or nips if multi-roll calender stack is used).

One or more passes through the press nip may be used to produce desired conversions from paper to film. Calender nip pressures preferably range from 20 to 2,000 pounds per linear inch (pli) and temperatures range from 40° to 115° C.

The paper may be saturated by immersion of the paper in a tray of plasticizer solution followed by blotting off the excess plasticizer with blotter paper. A coating press or gravure press may be used as an alternative saturating method. Suitable amounts of plasticizer are preferably from 70 to 120 weight percent of the weight of the cellulose ester content of the paper, the more preferred range being from 90 to 100 weight percent. The preferred cellulose ester content of the paper is between 70 and 85 weight percent with a basis weight of the paper between 50 to 75 g/m$^2$. The calender loading is preferably from 20 to 310 pli and the preferred temperature range is from 55° to 115° C. The calender stack configuration is preferably two rolls with a single nip. However, multiple nip calenders may be used. The saturated paper is passed through the press nip or multiple nips. One to three passes is preferred.

The thermoplastic films may also be prepared using a laminator. The procedure is very similar to the calendering procedure. However, the laminator uses minimal pressure on two sets of pinch rolls and has a contact heating element between the sets of pinch rolls and a heat sink after the last set of pinch rolls. When the plasticizer treated paper is passed through the laminator it is sandwiched between two sheets of release paper. The release paper contacts the nip roll, heat blocks, and heat sink. The temperature is approximately 175° C. with a rate of speed at approximately 0.86 ft/min. The laminator converts the paper to a transparent or plastic-like film with a slightly higher thickness than the conversion using a calendering stack.

The thermoplastic films may be used for many different applications. They are excellent as breathable films to create structures with proper surface properties, strength properties, and barrier properties. The breathable films may be used for diaper backing, wound dressings, filtration media and other medical packaging applications. These films offer benefits in the medical packaging area such as low cost, compostability/biodegradability, self-sealability, or sealability in general. The films may also be used as a tape base which is a lower cost substitute for 100 weight percent cellulose acetate tape bases currently in use. Another possible application would be as a release paper providing compostability/biodegradability to replace the use of silicone-based release coatings which cause problems in landfills.

The films of this invention and their preparation are illustrated by the following examples.

EXAMPLE 1

A 40 g/m$^2$ paper was made from a fiber furnish containing 50 wt % (weight percent) cellulose acetate fiber, 25 wt % softwood cellulose pulp and 25 wt % hardwood cellulose pulp (based on 100 wt % bone dry fiber furnish) to which was added 0.12 wt % of alkyl ketene dimer and 0.37 wt % of cationic starch (based on bone dry fiber furnish). The paper was saturated with 100 parts triacetin (1,2,3-propanetriol triacetate) per 100 parts cellulose acetate fiber in the paper. Treated 232.25 cm$^2$ sheets (7 total) were stacked individually between sheets of silicone release paper and placed between stainless steel plates pressed in a platen press at a pressure of 200 psig. The temperature was then increased from 31° C. to 155° C. Pressure was increased to 258 psig as temperature reached 115° C. After 35 minutes, the press was cooled with water for ten minutes and samples were removed when press temperature reached 71° C. Transparent sheets were produced having an average thickness of 0.002 inch and porosity less than 30 ml/min/$cm^2$ air flow at a 1.0 centibar pressure drop (measured on a Coresta type porosimeter using a 2 $cm^2$ sample area).

EXAMPLE 2

A 40 g/$m^2$ paper was made from a fiber furnish containing 50 wt % cellulose acetate fiber, 25 wt % percent softwood cellulose pulp and 25 wt % percent hardwood cellulose pulp to which was added 0.12 wt % of alkyl ketene dimer and 0.37 wt % of cationic starch. The paper was saturated with 60 parts triacetin (1,2,3-propanetriol triacetate) per 100 parts cellulose acetate fiber in the paper. Two treated 103.25 $cm^2$ sheets were calendered on a Wheeler Roll Co. two roll (steel and steel) lab scale calender stack at 101° C. top roll temperature and 114° C. bottom roll temperature and 393 pli (approximately 1572 psig) for three passes through the nip. Semi-clear films were produced resembling glassine paper having an average thickness of 0.0025 inch, an average porosity of 19 ml/min/$cm^2$ air flow at a 1.0 centibar pressure drop (measured on a Coresta type porosimeter using a 2 $cm^2$ sample area) and an opacity of 16.32 ±1.25% as measured by TAPPI method T425 on an ACS spectrophotometer.

EXAMPLE 3

A 52 g/$m^2$ paper was made from a fiber furnish containing 84 wt % cellulose acetate fiber, 13 wt % softwood cellulose pulp and 3 wt % hardwood cellulose pulp to which was added 0.12 wt % of alkyl ketene dimer and 0.37 wt % of cationic starch (based on bone dry fiber furnish) and 0.2 wt % epichlorohydrin (based wet strength agent). The paper was saturated with 92 parts triacetin (1,2,3-propanetriol triacetate) per 100 parts cellulose acetate fiber in the paper. A treated 103.25 $cm^2$ sheet was calendered on a Wheeler Roll Co. two roll (steel and steel) lab scale calender stack at 69° C. top roll temperature and 76° C. bottom roll temperature and 118 pli (approximately 472 psig) for three passes through the nip. Clear film was produced having one gloss and one matte surface and an opacity of 20.70% as measured by TAPPI Method T425 on an ACS spectrophotometer.

EXAMPLE 4

A 52 g/$m^2$ paper was made from a fiber furnish containing 84 wt % cellulose acetate fiber, 13 wt % softwood cellulose pulp and 3 wt % hardwood cellulose pulp to which was added 0.12 wt % of alkyl ketene dimer, 0.37 wt % of cationic starch and 0.2 wt % epichlorohydrin based wet strength agent. The paper was saturated with 96 parts of a plasticizer mixture of 3 wt % cellulose acetate and 97 wt % triacetin (1,2,3-propanetriol triacetate based on total plasticizer mixture weight) per 100 parts cellulose acetate fiber in the paper. Treated 103.25 $cm^2$ sheets were calendered on a Wheeler Roll Co. two roll (steel and steel) lab scale calender stack at 95° C. top roll temperature and 86° C. bottom roll temperature and 310 pli (approximately 1260 psig), one pass and two passes through the nip. Clear film was produced resembling cast cellulose acetate sheet. The film produced in one pass had a thickness of 0.004 to 0.005 inch, a porosity of 2 ml/min/$cm^2$ air flow at a 1.0 centibar pressure drop (measured on a Corresta type porosimeter using a 2 $cm^2$ sample area) and an opacity of 9.97 ±0.08% as measured by TAPPI Method T425 on an ACS spectrophotometer. The film produced in two passes had a micro-creped appearance and had a thickness of 0.0035 to 0.0045 inch, a porosity of less than 1 ml/min/$cm^2$ air flow at a 1.0 centibar pressure drop and an opacity of 17.76 ±0.07%.

EXAMPLE 5

Pieces of film containing an admixture of 50 wt % cellulose acetate fiber and 50 wt % cellulose fiber and triacetin were uniformly dispersed throughout a compost media and placed in a compost unit A. The compost media consisted of dehydrated alfalfa meal, cottonseed meal, poplar sawdust, cow manure, garden soil, newspaper, calcium carbonate, sodium bicarbonate and water. After 21 days the film biodegraded, i.e. it was disintegrated to the point that it was indistinguishable from the composite.

Pieces of film containing an admixture of 42.5 wt % hydrolyzed cellulose acetate fiber, 42.5 wt % cellulose fiber and 15 wt % $TiO_2$ and triacetin were also added to the same compost media and placed in a compost unit B. After 63 days the film composted.

The thermoplastic films of the present invention made from cellulose ester and cellulose fibers provide significant processing and property advantages over the prior art thermoplastic films of cellulose esters. In preparing the films of the present invention the use of solvents is eliminated by substitution of plasticizers. By the inclusion of cellulose fibers, the films are strengthened over the prior art allowing for the use of conventional paper printing materials and techniques making the films economically attractive.

The invention has been described in detail with particular reference to preferred embodiments and methods thereof, but it will be understood that variations and modifications can be effected within the spirit and scope of the invention.

What is claimed is:

1. A thermoplastic film comprising an admixture of 20 to 85 weight percent cellulose ester fibers and 80 to 15 weight percent cellulose fibers and a functional amount of a cellulose ester plasticizer, said film having an opacity in the range of 10 to 85 percent, a thickness in the range of 0.002 to 0.010 inch, and a porosity in the range of 0.0 to 50 ml/min/$cm^2$ at a 1.0 centibar pressure drop, wherein the thermoplastic film is capable of being indistinguishable from a composting media within a composting time of 21 to 65 days, said composting media consisting of dehydrated alfalfa meal, cotton seed meal, poplar sawdust, cow manure, garden soil, newspaper, calcium carbonate, sodium bicarbonate, and water.

2. The film of claim 1 wherein the admixture comprises 50 to 85 cellulose ester fibers and 50 to 15 weight percent cellulose fibers.

3. The film of claim 1 wherein the cellulose ester is selected from the group comprising cellulose acetate, cellulose acetate butyrate and cellulose acetate propionate.

4. The film of claim 3 wherein the cellulose ester is cellulose acetate.

5. The film of claim 4 wherein said cellulose acetate fibers have an acetyl value in the range of 34 to 41 weight percent.

6. The film of claim 4 wherein said cellulose acetate fibers are surface hydrolyzed.

7. The film of claim 6 wherein said cellulose acetate fibers have a sheath of regenerated cellulose being from about 4 to about 15 weight percent of the weight of said cellulose acetate fibers and a core of cellulose acetate, contain no substantial crimp, and have an average length from about 1 to about 7 mm, a density from about 1.20 to about 1.35 gm/cc, and a denier from about 1 to about 30 grams per 9,000 meters, and said film has a uniform dispersion index of less than 0.15.

8. The film of claim 4 wherein said cellulose acetate fibers are uniformly dispersed in said film, have a weighted average length in the range of 1 to 7 mm, have a density in the range of 1.20 to 1.35 gm/cc, have a denier in the range of 1 to 30, have a range of 0.10 to 0.20 weight percent lubricant thereon and exhibit no substantial fibrillation, and said film has a uniform dispersion index of less than 0.15.

9. The film of claim 1 wherein the amount of plasticizer is in the range of 20 to 150 weight percent, based on the weight of said cellulose ester fibers.

10. The film of claim 9 wherein the amount of plasticizer is in the range of 45 to 120 weight percent.

11. The film of claim 1 wherein said plasticizer is selected from the group consisting of diethyl phthalate, triethyl citrate, polypropylene glycol-dibenzoate-benzoate ester, poly oxy(methyl-1,2-ethanediyl)-benzoyl-(benzoyloxy), a 60 weight percent N-ethyl-2-methyl-benzenesulfonamide/40 weight percent N-ethyl-4-methyl-benzenesulfonamide mixture, a 60 weight percent 4-methyl-benzenesulfonamide/40 weight percent 2-methyl-benzenesulfonamide mixture, a 72 weight percent diethyl phthalate/22 weight percent dimethyl phthalate/6 weight percent 2,2,4-trimethyl-1,3-pentanediol-diisobutyrate mixture, triacetin, triacetin/1–3 weight percent cellulose acetate solution, and triacetin/diethyl phthalate.

12. The film of claim 1 further comprising print encapsulated within said film, whereby the film provides an abrasive resistant surface to protect the print.

13. The film of claim 1 further being a breathable film having a water vapor transmission rate of greater than 400 gm/100 $in^2$/day.

14. The film of claim 1 further being a substantially moisture impermeable film having a water vapor transmission rate of between about 15 to about 85 gm/100 $in^2$/day.

* * * * *